US012633789B2

(12) United States Patent
Zhang et al.

(10) Patent No.: US 12,633,789 B2
(45) Date of Patent: May 19, 2026

(54) ROTOR FOR REDUCING EDDY CURRENT LOSS

(71) Applicant: SHANGHAI PANGOOD POWER TECHNOLOGY CO., LTD, Shanghai (CN)

(72) Inventors: Guangquan Zhang, Shanghai (CN); Jinhua Chen, Shanghai (CN); Wenxiong Yang, Shanghai (CN); Lei Tang, Shanghai (CN); Li Xia, Shanghai (CN)

(73) Assignee: SHANGHAI PANGOOD POWER TECHNOLOGY CO., LTD, Shanghai (CN)

( * ) Notice: Subject to any disclaimer, the term of this patent is extended or adjusted under 35 U.S.C. 154(b) by 197 days.

(21) Appl. No.: 18/569,129

(22) PCT Filed: Sep. 17, 2021

(86) PCT No.: PCT/CN2021/119105
§ 371 (c)(1),
(2) Date: Dec. 11, 2023

(87) PCT Pub. No.: WO2022/267244
PCT Pub. Date: Dec. 29, 2022

(65) Prior Publication Data
US 2024/0291334 A1 Aug. 29, 2024

(30) Foreign Application Priority Data
Jun. 21, 2021 (CN) .......................... 202110685615.2

(51) Int. Cl.
*H02K 1/2795* (2022.01)

(52) U.S. Cl.
CPC ................................. *H02K 1/2795* (2022.01)

(58) Field of Classification Search
CPC ..................................................... H02K 1/2795
See application file for complete search history.

(56) References Cited

U.S. PATENT DOCUMENTS

2013/0028764 A1 1/2013 Yokozawa
2015/0283485 A1 10/2015 Bott
2016/0322869 A1* 11/2016 Takezaki .................. H02K 1/27

FOREIGN PATENT DOCUMENTS

CA 2885488 A1 10/2015
CN 101311021 A 11/2008
(Continued)

OTHER PUBLICATIONS

European Extended Search Report received for EP Application No. 21946728.9 on May 23, 2025, 7 pgs.
(Continued)

*Primary Examiner* — Viet P Nguyen
(74) *Attorney, Agent, or Firm* — Merchant & Gould P.C.

(57) ABSTRACT

A rotor for reducing eddy current loss, includes a rotor yoke, the rotor yoke has a fixing portion, and an inner ring portion and an outer ring portion connected to the fixing portion and disposed in the same direction; and a ring-shaped magnetic steel assembly, affixed to the fixing portion and radially affixed by means of the inner ring portion and the outer ring portion. The inner ring portion and/or the outer ring portion are uniformly provided with multiple channels blocking a transmission path of an eddy current, so as to increase resistance of the eddy current and thereby reduce eddy current loss, effectively preventing heating caused by eddy current loss, as well as preventing the phenomenon of magnetic steel demagnetization from occurring and affecting service life.

7 Claims, 2 Drawing Sheets

(56)  References Cited

FOREIGN PATENT DOCUMENTS

| | | | |
|---|---|---|---|
| CN | 204391931 | U | 6/2015 |
| CN | 105515242 | A | 4/2016 |
| CN | 106233578 | A | 12/2016 |
| CN | 107846096 | A | 3/2018 |
| CN | 109474148 | A | 3/2019 |
| CN | 109713819 | A | 5/2019 |
| CN | 110391703 | A | 10/2019 |
| CN | 210839106 | U | 6/2020 |
| CN | 112994403 | A | 6/2021 |
| CN | 113037040 | A | 6/2021 |
| CN | 113364179 | A | 9/2021 |
| EP | 3082226 | B1 | 4/2020 |
| JP | H05328706 | A | 12/1993 |
| JP | 2019019911 | A | 2/2019 |

OTHER PUBLICATIONS

Chinese Office Action received for CN Application No. 202110685615.2 on May 5, 2022, 13 pgs.
International Search Report and Written Opinion received for PCT Serial No. PCT/CN2021/119105 on Feb. 24, 2022, 12 pgs.

* cited by examiner

ROTOR FOR REDUCING EDDY CURRENT LOSS

CROSS-REFERENCE TO RELATED APPLICATIONS

This application is a National Stage Application of PCT/CN2021/129959, filed Nov. 11, 2021, which claims priority to Chinese Patent Application No. 202110685615.2, filed on Jun. 21, 2021, and which applications are incorporated herein by reference. To the extent appropriate, a claim of priority is made to each of the above-disclosed applications.

TECHNICAL FIELD

The present application relates to the technical field of electric motors, and in particular to a rotor for reducing an eddy current loss.

BACKGROUND

When an electric motor is rotating, an electromotive force is generated at the surface of a metal conductor (including the magnetic steel of a rotor) which is in an alternating magnetic field due to electromagnetic induction, and the electromotive force generates a self-closed vortex-like eddy current due to the presence of a resistance. This phenomenon is called the eddy current effect. In the case of high-speed rotation, the eddy current loss becomes large, which leads to a significant temperature rise. If the temperature is too high, the magnetic steel will be irreversibly demagnetized, so it is necessary to suppress the eddy current loss.

SUMMARY

In order to solve the above problems, a rotor for reducing an eddy current loss is provided according to the present application, which prevents the temperature rise and utilizes channels provided at an inner ring portion, an outer ring portion, and a fixing portion for reducing the eddy current.

A rotor for reducing an eddy current loss includes:

a rotor yoke, where the rotor yoke includes a fixing portion, and an inner ring portion and an outer ring portion both connected to the fixing portion and arranged in a same direction;

a magnetic steel assembly being annular-shaped, where the magnetic steel assembly is fixed to the fixing portion and is radially fixed through the inner ring portion and the outer ring portion; and multiple channels are uniformly provided in the inner ring portion and/or the outer ring portion, to reduce the eddy current loss.

In an embodiment, the multiple channels are each provided along an axial direction, a radial direction, or a circumferential direction of the magnetic steel assembly.

In an embodiment, each of channels in the inner ring portion of the multiple channels is provided along an axial direction of the magnetic steel assembly and runs through the inner ring portion and the fixing portion.

In an embodiment, each of channels in the outer ring portion of the multiple channels is provided along a radial direction of the magnetic steel assembly.

In an embodiment, each of channels in the outer ring portion of the multiple channels is located at an end face of the outer ring portion away from the fixing portion.

In an embodiment, both the channels in the inner ring portion and the channels in the outer ring portion are provided at equal intervals along a circumferential direction of the magnetic steel assembly.

In an embodiment, a channel is provided in the fixing portion.

In an embodiment, the channel the fixing portion is provided along a circumferential direction of the magnetic steel assembly.

In an embodiment, the multiple channels are arranged at intervals along a radial direction of the magnetic steel assembly.

In an embodiment, a size of the inner ring portion and a size of the outer ring portion in an axial direction of the magnetic steel assembly are smaller than an axial size of the magnetic steel assembly.

Compared with the conventional technology, the above technical solutions have the following advantages.

The size of the inner ring portion and the size of the outer ring portion in the axial direction of the magnetic steel assembly are smaller than the axial size of the magnetic steel assembly, which facilitates the assembly of the magnetic steel assembly and the rotor yoke, and preliminarily reduces the eddy current loss of the rotor yoke. In addition, with the multiple channels being uniformed provided in the inner ring portion and/or the outer ring portion, the transfer path of the eddy current is blocked to increase the resistance of the eddy current, which achieves the purpose of reducing the eddy current loss, effectively avoids the temperature rise caused by the eddy current loss, thereby prevents the demagnetization of the magnetic steel and the impact on the service life, and ultimately improves the working efficiency of the motor.

The present application is further described below in conjunction with the drawings and the embodiments.

DETAILED DESCRIPTION OF THE EMBODIMENTS

Figure 1:
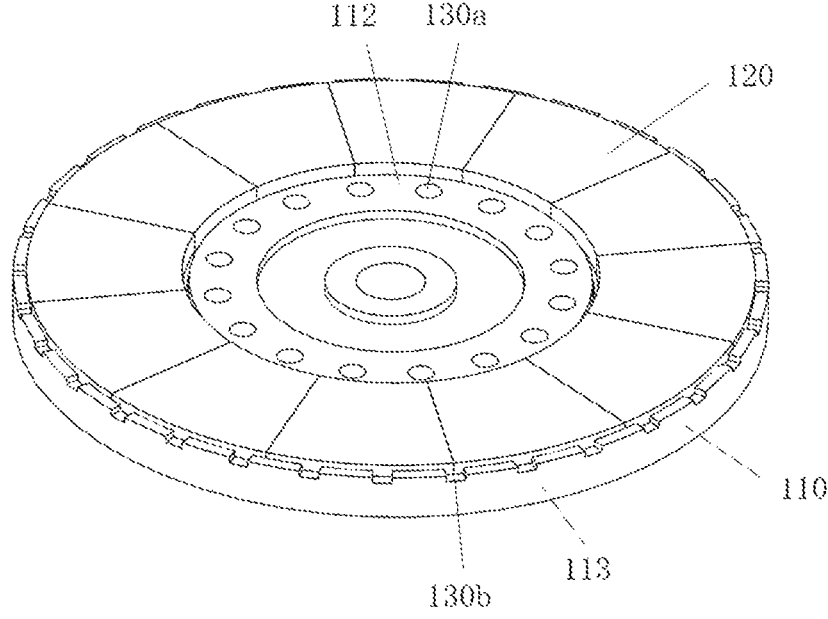
FIG. 1 is a schematic view showing the structure of a rotor for reducing an eddy current loss according to the present application.

The following description is provided to disclose the present application to enable those skilled in the art to implement the present application. The preferred embodiments in the following description are only examples, and other obvious modifications may be obtained by those skilled in the art. The basic principles of the present application defined in the following description may be applied to other embodiments, variations, improvements, equivalents, and other technical solutions without departing from the scope of the present application.

As shown in FIGS. 1 to 4, a rotor for reducing an eddy current loss includes:

a rotor yoke 110, where the rotor yoke 110 includes a fixing portion 111, and an inner ring portion 112 and an outer ring portion 113 both connected to the fixing portion 111 and arranged in a same direction;

a magnetic steel assembly 120 being annular-shaped, where the magnetic steel assembly 120 is fixed to the fixing portion 111 and is radially fixed through the inner ring portion 112 and the outer ring portion 113; and multiple channels 130a, 130b, and 130c are uniformly formed in the inner ring portion 112 and/or the outer ring portion 113 to reduce the eddy current loss.

By uniformly providing the multiple channels 130a, 130b, and 130c in the inner ring portion 112 and/or the outer ring portion 113, the transfer path of an eddy current is blocked, to increase the resistance of the eddy current, so as to achieve the purpose of reducing the eddy current loss, which effectively avoids the temperature rise caused by the eddy current loss, and thereby prevents the demagnetization of the magnetic steel and the impact on service life.

Figure 2:
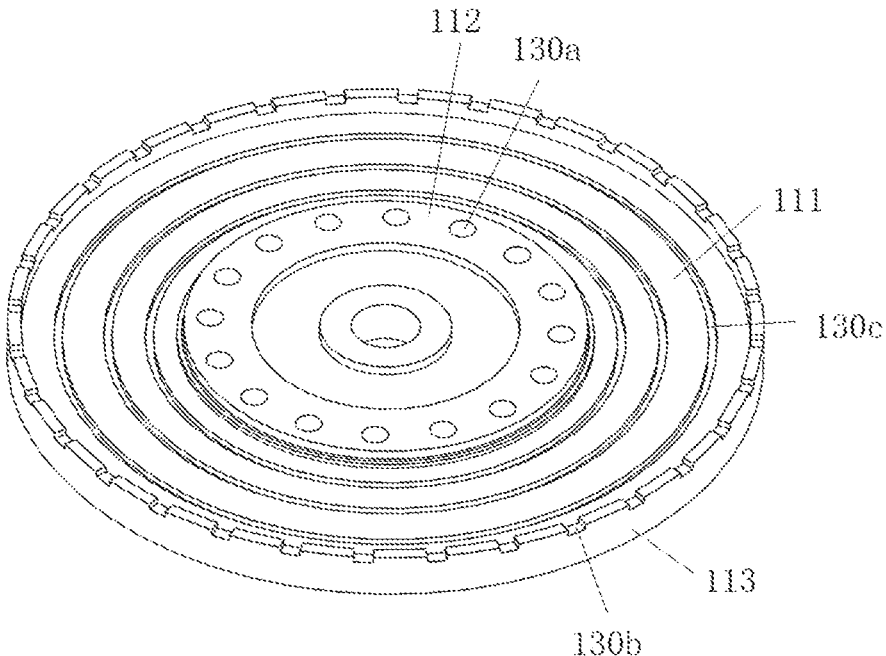
FIG. 2 is a perspective view of a rotor yoke according to the present application.
Figure 3:
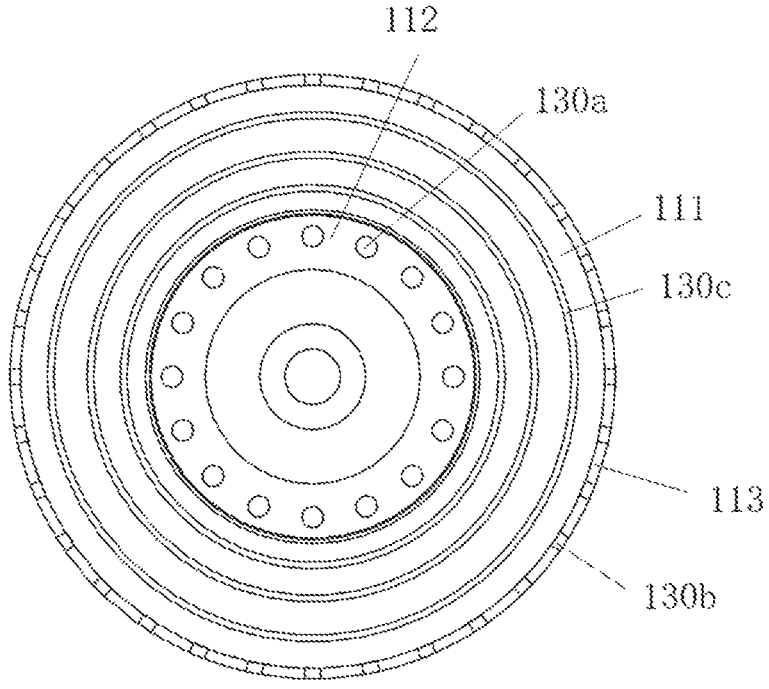
FIG. 3 is a front view of the rotor yoke according to the present application.
Figure 4:
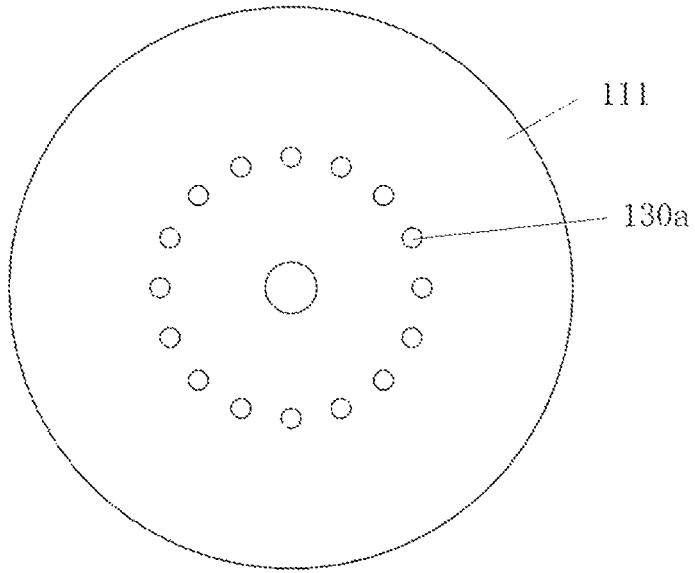
FIG. 4 is a rear view of the rotor yoke according to the present application.

As shown in FIGS. 2 to 4, the fixing portion 111 is annular-shaped. An inner edge portion and an outer edge portion of the fixing portion 111 extend in a same direction to form the inner ring portion 112 and the outer ring portion 113 respectively, so that an annular groove for mounting the magnetic steel assembly 120 is defined by the fixing portion 111, the inner ring portion 112, and the outer ring portion 113. When the magnetic steel assembly 120 is mounted in the annular groove, the inner ring portion 112 abuts against an inner periphery of the magnetic steel assembly 120, and the outer ring portion 113 abuts against an outer periphery of the magnetic steel assembly 120, so that the magnetic steel assembly 120 is radially fixed by the inner ring portion 112 and the outer ring portion 113.

It should be noted that the fixing portion 111, the inner ring portion 112, and the outer ring portion 113 may be integrally formed.

As shown in FIGS. 2 and 3, the channels 130a, 130b, and 130c may be provided along the axial direction, the radial direction, or the circumferential direction of the magnetic steel assembly 120.

In an embodiment, each of the channels 130a in the inner ring portion 112 is provided along the axial direction of the magnetic steel assembly 120 and runs through the inner ring portion 112 and the fixing portion 111. Specifically, each of the channels 130a is provided along the axial direction of the magnetic steel assembly 120 and is located in the inner ring portion 112, and the channels 130a each penetrates or partially penetrates the inner ring portion 112 and the fixing portion 111, and the channels 130a are provided at equal intervals along the circumferential direction of the magnetic steel assembly 120.

In another embodiment, each of the channels 130b in the outer ring portion 113 is provided along the radial direction of the magnetic steel assembly 120. Specifically, each of the channels 130b is provided along the radial direction of the magnetic steel assembly 120 and is located in the outer ring portion 113. The channels 130b each penetrates or partially penetrates the outer ring portion 113, and the channels 130b are provided at equal intervals along the circumferential direction of the magnetic steel assembly 120. Preferably, the channels 130b in the outer ring portion 113 are located at an end face of the outer ring portion 113 away from the fixing portion 111, as shown in FIG. 2. Alternatively, the channels 130b may be located in a middle portion of the outer ring portion 113.

Further, a size of the inner ring portion 112 in the radial direction of the magnetic steel assembly 120 is greater than a size of the outer ring portion 113 in the radial direction of the magnetic steel assembly 120. For example, the size of the inner ring portion 112 in the radial direction of the magnetic steel assembly 120 is three or more times the size of the outer ring portion 113 in the radial direction of the magnetic steel assembly 120. Since the size of the inner ring portion 112 in the radial direction of the magnetic steel assembly 120 is relatively large, the channels 130a provided in the axial direction of the magnetic steel assembly 120 can be formed in the inner ring portion 112; the size of the outer ring portion 113 in the radial direction of the magnetic steel assembly 120 is relatively small, the channels 130b provided along the radial direction of the magnetic steel assembly 120 can be formed in the outer ring portion 113. Of course, the shapes of the channels at the inner ring portion 112 and the outer ring portion 113 may be interchanged.

Further, cross sections of the channels 130a and 130b may be in regular or irregular shapes. Taking regular shapes as an example, the cross section of the channel 130a is circular, and the cross section of the channel 130b is rectangular, which is not limited to this.

It is worth noting that, the number of the channels 130a in the inner ring portion 112 is smaller than the number of the channels 130b in the outer ring portion 113. For example, the number of the channels 130b in the outer ring portion 113 is twice the number of the channels 130a in the inner ring portion 112.

As shown in FIGS. 2 and 3, the channel 130c is provided along the circumferential direction of the magnetic steel assembly 120, and may be provided in the inner ring portion 112, the outer ring portion 113, or the fixing portion 111. Taking the inner ring portion 112 as an example, the channel 130c is provided at an end face of the inner ring portion 112 away from the fixing portion 111, and multiple channels 130c may be provided at intervals along the radial direction of the magnetic steel assembly 120. Taking the outer ring portion 113 as an example, the channel 130c is provided at an outer periphery face of the outer ring portion 113, and multiple channels 130c are provided at intervals along the axial direction of the magnetic steel assembly 120.

Taking the fixing portion 111 as an example, the channels 130c are provided at an end face of the fixing portion 111 that is connected to the inner ring portion 112 and the outer ring portion 113, that is, the channels 130c are provided at the end face of the fixing portion 111 that is connected to the magnetic steel assembly 120. The channels 130c in the fixing portion 111 are each provided along the circumferential direction of the magnetic steel assembly 120, and the multiple channels 130c are arranged at intervals along the radial direction of the magnetic steel assembly 120. The distance between the channels 130c increases sequentially from inside to outside, or, the channels 130c may also be arranged at equal intervals.

Further, the channel 130c is provided along the circumferential direction of the magnetic steel assembly 120, and may be in a closed ring shape. Alternatively, the channel 130c may also be composed of multiple arc-shaped structures.

As shown in FIGS. 1 and 2, a size of the inner ring portion 112 and a size of the outer ring portion 113 in the axial direction of the magnetic steel assembly 120 are smaller than the axial size of the magnetic steel assembly 120. That is, after the magnetic steel assembly 120 is fixed to the rotor yoke 110, the magnetic steel assembly 120 is higher than the inner ring portion 112 and the outer ring portion 113, as shown in FIG. 1. With the above structure, the assembly of the magnetic steel assembly 120 and the rotor yoke 110 is facilitated, and the eddy current loss of the rotor yoke is preliminarily reduced.

Specifically, the size of the outer ring portion 113 in the axis direction of the magnetic steel assembly 120 is greater than the size of the inner ring portion 112 in the axis direction of the magnetic steel assembly 120.

As shown in FIG. 1, the magnetic steel assembly 120 may be formed by multiple sub magnetic steels being assembled together, each of the multiple sub magnetic steels is fan-shaped, and the multiple sub magnetic steels are arranged in an annular manner to be fixed to the rotor yoke 110.

To sum up, the size of the inner ring portion 112 and the size of the outer ring portion 113 in the axial direction of the magnetic steel assembly 120 are smaller than the axial size of the magnetic steel assembly 120, which facilitates the assembly of the magnetic steel assembly 120 and the rotor yoke 110, and preliminarily reduces the eddy current loss of the rotor yoke. In addition, with the multiple channels 130*a*, 130*b*, and 130*c* being uniformly provided in the inner ring portion 112 and/or outer ring portion 113, the transfer path of the eddy current is blocked to increase the resistance of the eddy current, which achieves the purpose of reducing the eddy current loss, effectively avoids the temperature rise caused by the eddy current loss, thereby prevents the demagnetization of the magnetic steel and the impact on the service life, and ultimately improves the working efficiency of a motor.

The above embodiments are only used to illustrate technical ideas and characteristics of the present application, and the purpose thereof is to enable those skilled in the art to understand the content of the present application and implement it accordingly. The scope of the present application cannot be limited only by the embodiments, that is, any equivalent changes or modifications made in accordance with the principle of the present application shall fall within the scope of the present application.

The invention claimed is:

1. A rotor for reducing an eddy current loss, comprising:
a rotor yoke, wherein the rotor yoke comprises a fixing portion, and an inner ring portion and an outer ring portion both connected to the fixing portion and arranged in a same direction;
a magnetic steel assembly being annular-shaped, wherein the magnetic steel assembly is fixed to the fixing portion and is radially fixed through the inner ring portion and the outer ring portion; wherein
a plurality of channels are uniformly provided in the inner ring portion and another plurality of channels are uniformly provided in the outer ring portion, to reduce the eddy current loss; and wherein
the fixing portion is annular-shaped, an inner edge portion and an outer edge portion of the fixing portion extend in the same direction to form the inner ring portion and the outer ring portion respectively, and an annular groove for mounting the magnetic steel assembly is defined by the fixing portion, the inner ring portion, and the outer ring portion;
each of the plurality of channels in the inner ring portion is provided along an axial direction of the magnetic steel assembly and runs through the inner ring portion and the fixing portion;
each of the another plurality of channels in the outer ring portion is provided along a radial direction of the magnetic steel assembly; and
each of the another plurality of channels in the outer ring portion is located at an end face of the outer ring portion away from the fixing portion.

2. The rotor for reducing an eddy current loss according to claim 1, wherein the plurality of channels are each provided along the axial direction of the magnetic steel assembly, and the another plurality of channels are each provided along the radial direction of the magnetic steel assembly.

3. The rotor for reducing an eddy current loss according to claim 1, wherein both the plurality of channels in the inner ring portion and the another plurality of channels in the outer ring portion are provided at equal intervals along a circumferential direction of the magnetic steel assembly.

4. The rotor for reducing an eddy current loss according to claim 1, wherein a channel is provided in the fixing portion.

5. The rotor for reducing an eddy current loss according to claim 4, wherein the channel in the fixing portion is provided along a circumferential direction of the magnetic steel assembly.

6. The rotor for reducing an eddy current loss according to claim 5, wherein the number of the channel in the fixing portion is plural, and the plurality of channels are arranged at intervals along the radial direction of the magnetic steel assembly.

7. The rotor for reducing an eddy current loss according to claim 1, wherein a size of the inner ring portion and a size of the outer ring portion in the axial direction of the magnetic steel assembly are smaller than an axial size of the magnetic steel assembly.

* * * * *